US008732775B2

(12) United States Patent
Kellicker (10) Patent No.: US 8,732,775 B2
(45) Date of Patent: *May 20, 2014

(54) SYSTEMS AND METHODS OF PROCESSING CLOSED CAPTIONING FOR VIDEO ON DEMAND CONTENT

(71) Applicant: Wowza Media Systems, LLC, Evergreen, CO (US)

(72) Inventor: Scott Kellicker, Worthington, OH (US)

(73) Assignee: Wowza Media Systems, LLC, Evergreen, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/889,979

(22) Filed: May 8, 2013

(65) Prior Publication Data

US 2014/0109158 A1 Apr. 17, 2014

Related U.S. Application Data

(63) Continuation of application No. 13/652,272, filed on Oct. 15, 2012.

(51) Int. Cl.
*H04N 7/10* (2006.01)
*H04N 7/173* (2011.01)
*H04N 11/00* (2006.01)

(52) U.S. Cl.
USPC ............................... 725/91; 725/32; 348/468

(58) Field of Classification Search
USPC ........................ 725/87, 91, 40, 32; 348/468
See application file for complete search history.

(56) References Cited

U.S. PATENT DOCUMENTS

| 5,347,365 | A | * | 9/1994 | Harigai et al. ................ 348/525 |
| 5,572,260 | A | * | 11/1996 | Onishi et al. .................. 348/460 |
| 7,272,658 | B1 | | 9/2007 | Edelman et al. |
| 7,587,509 | B1 | | 9/2009 | Edelman et al. |
| 7,961,878 | B2 | | 6/2011 | Whillock et al. |
| 8,051,287 | B2 | | 11/2011 | Shetty et al. |
| 8,065,426 | B2 | | 11/2011 | Edelman et al. |
| 8,205,076 | B1 | | 6/2012 | Shetty et al. |
| 8,245,033 | B1 | | 8/2012 | Shetty et al. |
| 8,284,932 | B2 | | 10/2012 | Whillock et al. |
| 8,285,867 | B1 | | 10/2012 | Edelman et al. |
| 2002/0154891 | A1 | * | 10/2002 | Kimura et al. .................. 386/68 |

(Continued)

FOREIGN PATENT DOCUMENTS

WO 2009052118 A3 4/2009

OTHER PUBLICATIONS

Zencoder; "Captions Embed Closed Captions for Web, Mobile, and OTT"; retrieved on Oct. 4, 2012 from "http://zencoder.com/captions/index.html"; 3 pages.

(Continued)

*Primary Examiner* — James R Sheleheda
(74) *Attorney, Agent, or Firm* — Toler Law Group, PC (57) ABSTRACT

A method includes receiving closed captioning data at a computing device. The closed captioning data is associated with a video on demand asset and is represented in a first format. The method also includes, during a single video on demand streaming session, converting the closed captioning data from the first format to a platform-independent format and converting the closed captioning data from the platform-independent format to a second format. The method further includes transmitting, during the single video on demand streaming session, the closed captioning data in the second format to a destination device.

20 Claims, 4 Drawing Sheets

(56) References Cited

U.S. PATENT DOCUMENTS

| | | | |
|---|---|---|---|
| 2006/0109378 A1* | 5/2006 | Yang et al. | 348/465 |
| 2007/0027844 A1* | 2/2007 | Toub et al. | 707/3 |
| 2008/0129864 A1* | 6/2008 | Stone et al. | 348/468 |
| 2010/0141834 A1 | 6/2010 | Cuttner | |
| 2010/0265397 A1* | 10/2010 | Dasher et al. | 348/468 |
| 2011/0149153 A1* | 6/2011 | Nam et al. | 348/468 |
| 2011/0164673 A1* | 7/2011 | Shaffer | 375/240.01 |
| 2011/0302417 A1 | 12/2011 | Whillock et al. | |
| 2012/0023255 A1 | 1/2012 | Edelman et al. | |
| 2012/0176540 A1* | 7/2012 | Labrozzi et al. | 348/468 |
| 2012/0240172 A1* | 9/2012 | Phillips et al. | 725/93 |
| 2012/0316860 A1* | 12/2012 | Reitan | 704/2 |

OTHER PUBLICATIONS

National Association of the Deaf; FCC Releases Internet Protocol Captioning Rules; retrieved on Oct. 4, 2012 from "http://transition.fcc.gov/Daily_Releases_Business/2012/db0113/FCC-12-9A1.pdf"; 3 pages.

46632; Federal Register; vol. 77, No. 151; Monday, Aug. 6, 2012; Rules and Regulations; retrieved on Oct. 4, 2012; 2 pages.

Wikipedia; Real Time Messaging Protocol; retrieved on Oct. 3, 2012 from "http://en.wikipedia.org/w/index.php?title=Real_Time_Messaging_Protocol&oldid=515452950"; 10 pages.

Adobe Systems; RTMP Specification License; Apr. 2009; http://www.adobe.com/devnet/rtmp/.; retrieved on Oct. 4, 2012; 70 pages.

* cited by examiner

CC Data in Platform-Independent Format

210

| No. | 1 |
|---|---|
| Text | "JOHN: He should be here any minute." |
| Start Time | 0:19:20.000 |
| End Time | 0:19:22:000 |
| Language | eng |
| Location | <50, 400> |
| Font | Proportional Sans Serif |
| Size | 2 |
| Style | |
| BG Color | Black |
| FG Color | White |
| Passed-through | |

231 — No.
232 — Text
233 — Start Time
234 — End Time
235 — Language
236 — Location
237 — Font
238 — Size
239 — Style
240 — BG Color
241 — FG Color
242 — Passed-through

220

| No. | 2 |
|---|---|
| Text | "[KNOCKING ON THE DOOR]" |
| Start Time | 0:19:21.700 |
| End Time | 0:19:23:700 |
| Language | eng |
| Location | <30, 300> |
| Font | Proportional Sans Serif |
| Size | 2 |
| Style | Italics |
| BG Color | Black |
| FG Color | White |
| Passed-through | |

SYSTEMS AND METHODS OF PROCESSING CLOSED CAPTIONING FOR VIDEO ON DEMAND CONTENT

CROSS-REFERENCE TO RELATED APPLICATIONS

The present application is a continuation of and claims priority to U.S. patent application Ser. No. 13/652,272, filed Oct. 15, 2012 and entitled "SYSTEMS AND METHODS OF PROCESSING CLOSED CAPTIONING FOR VIDEO ON DEMAND CONTENT", the content of which is incorporated by reference in its entirety.

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., pre-recorded television shows and movies) can be streamed via the Internet to personal electronic devices (e.g., computers, mobile phones, and Internet-enabled televisions).

Broadcast television channels typically include one or more closed captioning tracks to make programs more accessible to those that are deaf or hard of hearing. Similarly, movies on digital video discs (DVDs) often include subtitle tracks in multiple languages. However, Internet-accessible content is not typically provided with closed captioning. Moreover, the large number of available closed captioning formats makes it difficult to implement closed captioning systems that are compatible with the various electronic devices and platforms available to consumers, even though government regulations may mandate closed captioning for Internet-accessible content. For example, in the United States, the Federal Communications Commission (FCC) has issued a rule entitled "Closed Captioning of Internet Protocol-Delivered Video Programming: Implementation of Twenty-First Century Communications and Video Accessibility Act of 2010." Many providers for streaming video may be concerned with only a specific streaming technology, application, or platform. Thus, a single-platform closed captioning system offered by such providers in response to government regulations may not support a large number of users that use different closed captioning formats and may not scale as new closed captioning formats become popular.

SUMMARY

Systems and methods of processing closed captioning data for video on demand content are disclosed. The disclosed systems and methods may support receiving closed captioning data in a variety of embedded and file-based formats and outputting, on-the-fly, closed captioning data in accordance with a variety of output protocols for delivery to a variety of devices and mobile device platforms.

For example, closed captioning data in one or more languages may be received as a timed text markup language (TTML) file or as part of a motion picture experts group (MPEG)-4 part 14 (MP4) video stream. The closed captioning data may be converted into a platform-independent format (e.g., a platform-independent timed text representation). The data in the platform-independent format may then be converted into a desired output format that is compatible with a streaming protocol to be used to deliver the closed captions (and video stream) to a destination device. If multiple types of devices request closed captions at the same time, multiple closed caption streams may be generated on-the-fly from the platform-independent data. For example, platform-independent captioning data may be used to generate consumer electronics association (CEA)-608 captions that are embedded into a hypertext transfer protocol (HTTP) live streaming (HLS) stream, action message format (AMF) on TextData events included in a HTTP dynamic streaming (HDS) stream, and/or captions included in a smooth streaming manifest. The described systems and methods may advantageously utilize a plug-in architecture, enabling users to create custom ingesters to convert input captions to the platform-independent format and custom converters to generate output captions from data represented in the platform-independent format.

DETAILED DESCRIPTION

Figure 1:
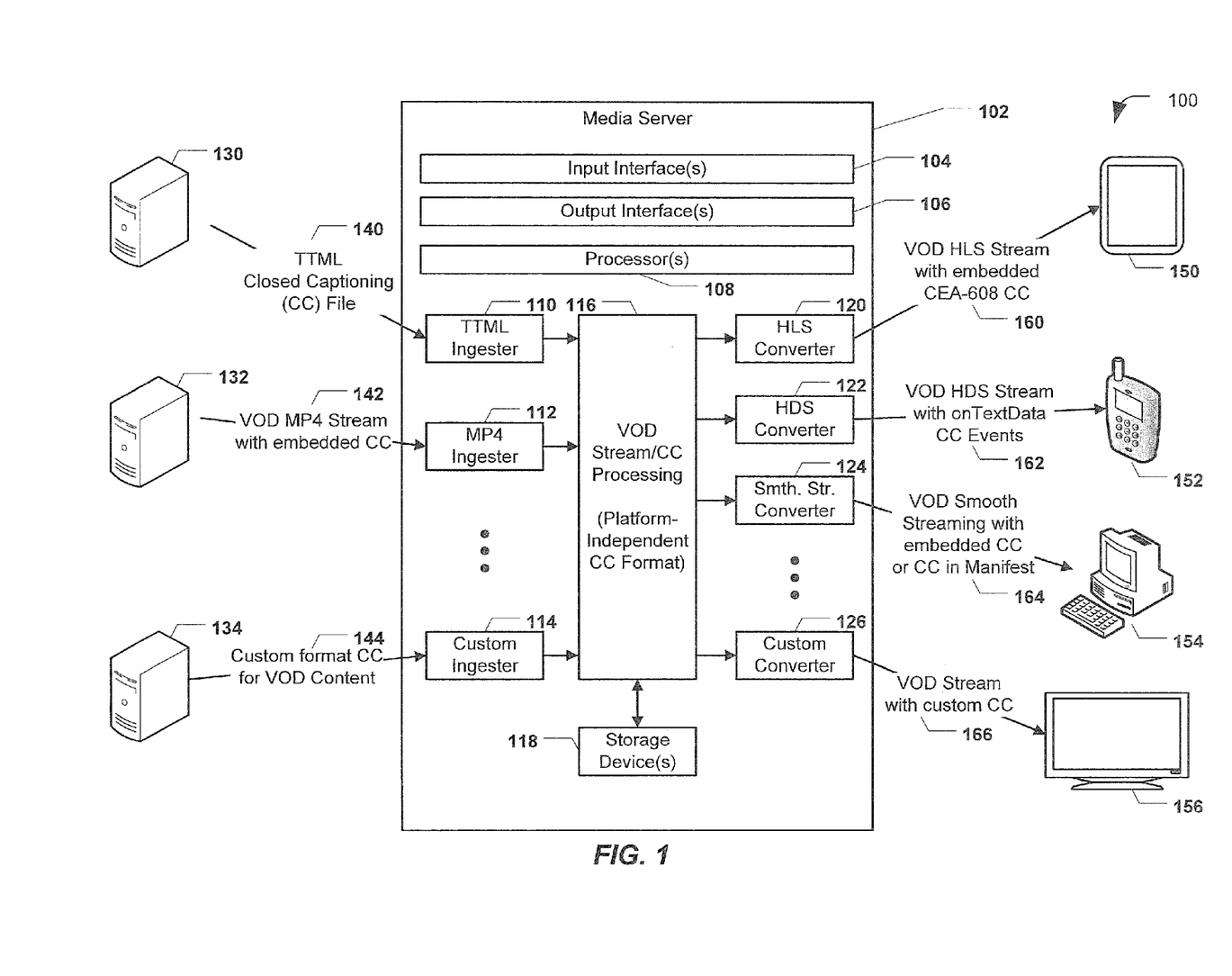
FIG. 1 is a block diagram of a particular embodiment of a system that is operable to process closed captioning for video on demand content.

FIG. 1 is a block diagram of a particular embodiment of a system 100 that is operable to process closed captioning for video on demand content. It should be noted, however, that although various embodiments herein are described with reference to closed captioning (e.g., text intended for those that are deaf or hard of hearing, and therefore including transcriptions of sounds, such as "wind howls" or "knocking on door"), the embodiments may also be used with subtitles (e.g., written translations of dialogue being spoken). Moreover, embodiments described herein may also be used to process and deliver "open" captioning (i.e., captions that appear "hardcoded" into a video stream and therefore cannot be selectively disabled like closed captioning).

The system 100 includes a media server 102 that includes one or more input interfaces 104, one or more output interfaces 106, and one or processors 108. As used herein, the term "media server" may refer to software application(s) that perform media serving and processing, hardware systems (e.g., servers) that support or perform media serving or processing, or any combination thereof. Thus, various operations described with reference to a media server may be implemented using hardware, software (e.g., instructions executable by the processor(s) 108) or any combination thereof.

The input interface(s) 104 may be configured to receive closed captioning data associated with a video on demand (VOD) asset, such as a pre-recorded television show, movie, etc. The incoming closed captioning data may be represented in a first format (e.g., a platform-specific format). In a particular embodiment, the input interface(s) 104 may be wired and/or wireless interfaces that enable the media server 102 to receive data via a network, such as the Internet. For example, the input interface(s) 104 may include an Ethernet interface, a universal serial bus (USB) interface, a wireless interface compatible with an Institute of Electrical or Electronics Engineers (TFEE) 802.11 protocol, etc. For example, the input interface(s) 104 may include a storage device, a file system, network attached storage (NAS), cloud based storage, etc. that is accessible to the media server 102 via a wired or wireless connection to a network (e.g., the Internet). In some embodiments, such input devices may be accessed without a network connection (e.g., via a direct load operation, a direct electrical link, etc.).

The output interface(s) 106 may be configured to transmit closed captioning data to a destination device (e.g., smartphones, tablet computers, laptop computers, set-top boxes, televisions, portable media players, game consoles, etc.). The outgoing closed captioning data may be represented in a second format (e.g., a second platform-specific format). In a particular embodiment, the output interface(s) 106 may be wired and/or wireless interfaces that enable the media server 102 to transmit data via a network, such as the Internet. For example, the output interface(s) 106 may include an Ethernet interface, a USB interface, a wireless interface compatible with an IEEE 802.11 protocol, etc. In some embodiments, like the input interface(s) 104, the output interface(s) 106 may include a storage device, a file system, network attached storage (NAS), cloud based storage, etc. that is accessible to the media server 102 via a wired or wireless connection to a network (e.g., the Internet). Alternately, such output devices may be accessed without a network connection (e.g., via a direct store operation, a direct electrical link, etc.). Thus, various types of input interface(s) 104 and output interface(s) 106 may be supported by the media server 102.

The media server 102 may also include various components configured to perform closed caption processing and stream processing functions. For example, the media server 102 may include one or more ingesters that are executable by the processor(s) 108. Each ingester may be configured to convert closed captioning data that is received via the input interface(s) 104 to a platform-independent format (e.g., a "generic" timed text representation). An illustrative example of a platform-independent format for closed captioning data is further described with reference to FIG. 2.

One or more of the ingesters may be configured to process closed captioning data that is included in data file(s). For example, a TTML ingester 110 may be configured to convert closed captioning data that is included in a TTML file 140 received from a first caption source 130 (e.g., the media server 102 itself, an external caption server, or an external VOD server) from a TTML format to the platform-independent format. The TTML ingester 110 may read and process the TTML file 140 in "chunks" or all at once. Additional ingesters may be provided to process embedded (e.g., "in-stream") captions. For example, an MP4 ingester 112 may be configured to extract closed captioning data that is embedded in an MP4 VOD stream 142 received from a second caption source 132 and to convert the extracted closed captioning data to the platform-independent format. The MP4 VOD stream 142 may include audio and video data associated with the VOD asset as well as timed text information associated with closed captioning for the VOD asset. One or more ingesters may also be configured to receive caption data from an external software system (e.g., software as a service (SaaS)).

In a particular embodiment, the media server 102 may expose details of the platform-independent format, so that users may define "custom" ingesters (e.g., an illustrative custom ingester 114 that receives custom format closed captioning data 144 from a third caption source 134) that can convert closed captioning data from other formats to the platform-independent format. Various embedded formats and file formats may be supported via "built-in" or custom ingesters. For example, the embedded formats may include, but are not limited to, action message format (AMF) on TextData events, consumer electronics association standards (CEA)-608, CEA-708, motion pictures expert group (MPEG)-4 part 17, 3rd generation partnership project (3GPP) timed text, digital video broadcasting (DVB) subtitling, sistema brasileiro de televisao digital (SBTVD), digital terrestrial multimedia broadcast (DTMB), and world system teletext (WST). The file formats may include, but are not limited to, scenarist closed captioning (SCC), timed text markup language (TTML), distributed format exchange profile (DFXP), society of motion picture and television engineers (SMPTE) timed text (SMPTE-TT), web video text tracks (WebVTT), SubRip (SRT), synchronized accessible media interchange (SAMI), European broadcasting union (EBU)-STL, and EBU timed text (EBU-TT).

The media server 102 may include a processing module 116 and one or more storage devices 118. The processing module 116 may perform various VOD stream processing operations, such as video transcoding, aspect ratio conversion, resolution conversion, color space conversion, format conversion, etc. The processing module 116 may also perform closed caption processing operations on closed captioning data that is received from the ingesters 110-114 in the platform-independent format.

The data storage device(s) 118 may include volatile memory (e.g., random access memory (RAM)). Alternately, or in addition, the storage device(s) 118 may include non-volatile memory, such as one or more hard disks. In a particular embodiment, the processing module 116 may store platform-independent closed captioning data and/or associated VOD assets in the data storage device(s) 118 for subsequent retrieval. Alternately, or in addition, the data storage device(s) 118 may be used to temporarily cache data during stream processing and closed caption processing. Storage and caching of data may be performed in-memory (e.g., to RAM) and/or to hard disk(s).

The media server 102 may further include one or more converters that are executable by the processor(s) 108. Each converter may be configured to convert closed captioning data that is received from the ingesters 110-114, the processing module 116, and/or the storage device(s) 118 from the platform-independent format to a particular output format. Various output formats may be supported by the media server 102.

For example, a hypertext transfer protocol (HTTP) live streaming (HLS) converter 120 may be configured to convert closed captioning data from the platform-independent format into CEA-608 format closed captioning that can be embedded in a HLS stream 160 transmitted to a tablet computer 150. The HLS stream 160 may include all or a portion of a VOD asset associated with the closed captioning. In a particular embodiment, the HLS stream 160 may be used to deliver VOD content and associated closed captioning to iOS® devices (iOS is a registered trademark of Cisco Systems, Inc. of San Jose, Calif. and is used by Apple Inc. of Cupertino, Calif. under license).

As another example, a HTTP dynamic streaming (RDS) converter 122 may convert closed captioning data from the platform-independent format into onTextData events that can be embedded in a HDS stream 162 that may be transmitted to a smartphone 152 or other device that is compatible with video for Adobe® Flash® (Adobe and Flash are registered trademarks of Adobe Systems Inc. of San Jose, Calif.).

As yet another example, the media server 102 may include a smooth streaming converter 124. "Smooth streaming" may generally refer to an Internet Information Services (IIS) extension from Microsoft Corp. of Redmond, Wash. that implements adaptive bitrate streaming. The smooth streaming converter 124 may convert closed captioning data from the platform-independent format into data that can be embedded in a smooth streaming stream 164 to be provided to a desktop computer 154 or included in a manifest associated with the stream 164. To illustrate, the smooth streaming stream 164 may be provided to devices running Microsoft® Silverlight® or other smooth streaming clients (Microsoft and Silverlight are registered trademarks of Microsoft Corp. of Redmond, Wash.).

In a particular embodiment, each of the ingesters 110-114 and the converters 120-126 may be implemented using software classes. For example, each of the ingesters 110-114 and the converters 120-126 may be Java classes that are executable by a Java Virtual Machine (NM) executing on the processor(s) 108. In alternate embodiments, non-Java implementations may be used. The media server 102 may thus provide a plug-in architecture to implement closed captioning for VOD assets. Specific ingesters and converters may be loaded dynamically (e.g., just-in-time), based on what types of captioning data is being received and what types of captioning data is being transmitted.

In a particular embodiment, the media server 102 may expose details of the platform-independent format. For example, the platform-independent format may be made available via application programming interfaces (APIs), documentation, and/or publically available class declaration or definition files. Exposing details of the platform-independent format may enable users, or third party developers, to define "custom" converters that can convert closed captioning data from platform-independent formats into other formats. For example, a custom converter 126 may generate a stream 166 that is provided to an Internet-enabled television 156. The output formats supported by the media server 102 may include, but are not limited to, HLS, EDS, smooth streaming, and MPEG dynamic adaptive streaming over HT IP (MPEG-DASH).

In a particular embodiment, custom converters may also be used to perform other output processing functions. For example, the custom converter 126 may color all captions associated with dialogue of a first speaker (e.g., "John") blue and all captions associated with dialogue of a second speaker (e.g., "Susan") orange (e.g., to enhance caption readability or to make such captions more distinguishable to a viewer that is color-blind). Multiple converters may be applied prior to transmitting an output stream to a destination device. Similarly, multiple ingesters may be applied when processing an input stream from a VOD or caption source.

During operation one or more of the ingesters 110-114 may receive closed captioning data associated with a VOD asset, where the closed captioning data is represented in a first format. For example, the closed captioning data may be in a file that is received by the media server 102 along with the VOD asset. Alternately, the VOD asset and/or the closed captioning data may previously have been received by the media server 102 and stored in the storage device(s) 118. As another example, the closed captioning data may be embedded in a stream of the VOD asset that is received by the media server 102. The ingesters 110-114 may convert the closed captioning data from the first format into the platform-independent format. The processing module 116 may perform stream processing operations on the VOD asset and/or may perform closed caption processing operations on the closed captioning data in the platform independent format. One or more of the converters 120-126 may convert the closed captioning data from the platform-independent format into a second format that is compatible with particular destination device(s).

The aforementioned operations may be performed on-the-fly (e.g., during a single VOD streaming session) in response to a request from a destination device for closed captioning data associated with a stream of a VOD asset. The request may be received during communication of a stream of the VOD asset, where the VOD asset is being received from one of the VOD sources 130-134 or the storage device(s) 118, transcoded by the processing module 116, and provided to the destination device. For example, a user at a destination device may elect to turn on closed captions for a VOD stream that the user is viewing. In a particular embodiment, the request may also specify a desired language for the closed captions. In response to the request, and without interrupting display of the VOD stream, the media server 102 may identify a source of the requested closed captioning data, load an ingester that is compatible with the format of the closed captioning data provided by the source, process the platform-independent closed captioning data provided by the ingester, load a converter to convert the processed platform-independent closed captioning data into a format that is compatible with the destination device, and provide the converted closed captioning data to the destination device. Similarly, the media server 102 may switch closed captioning from a first language to a second language without interrupting communication of the VOD stream. Moreover, it should be noted that although multiple ingesters 110-114 and multiple converters 120-126 are shown in FIG. 1, this is for example only. In some embodiments, a single ingester or type of ingester, and/or a single converter or type of converter, may be present. For example, the media server 102 may include the TTML ingester 110 but no video stream-based ingester. As another example, the media server 102 may include the MP4 ingester 112 but no file-based ingester.

The system 100 of FIG. 1 may thus enable dynamic receipt, conversion, and transmission of closed captioning data for VOD assets. For example, a VOD asset provider may provide a TTML file with closed captioning data and rely on the media server 102 to dynamically process the TTML file to provide closed captioning over multiple outbound protocols to multiple types of devices. Unlike single-format systems, the system 100 of FIG. 1 may process data in various input and output fat mats, thereby providing a flexible closed captioning framework that accommodates the disparity in formats provided by VOD sources and formats expected by destination devices. Moreover, the provided framework may be extended by users or third parties by creation of custom ingesters and custom converters (e.g., as new input and output formats become popular).

Figure 2:
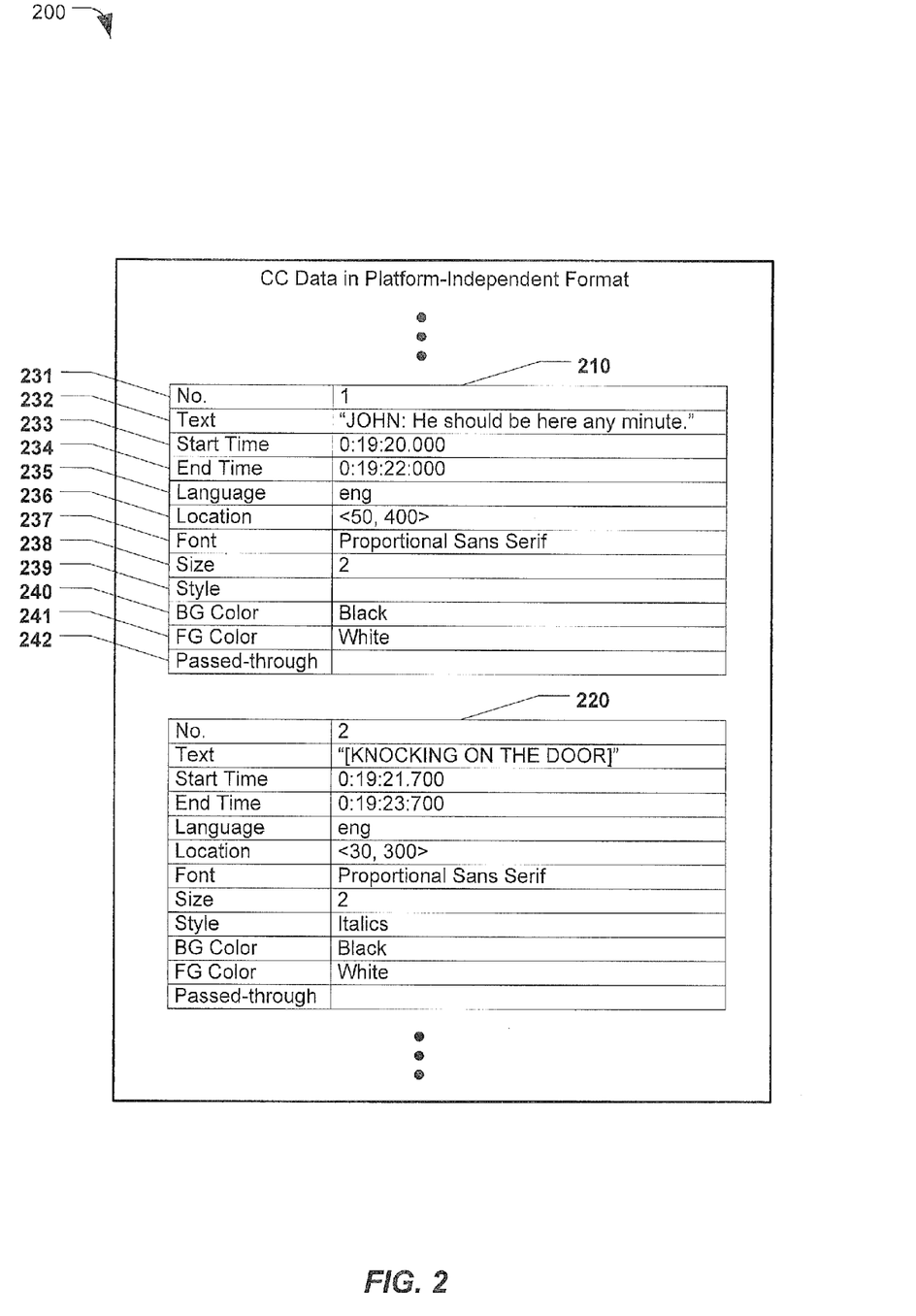
FIG. 2 is a diagram to illustrate a particular embodiment of a platform-independent closed captioning format that may be used by the system of FIG. 1.

FIG. 2 is a diagram to illustrate a particular embodiment of a platform-independent closed captioning format that may be used by the system 100 of FIG. 1, and is generally designated 200.

In FIG. 2, the platform-independent closed captioning data includes a first segment 210 of timed text and a second segment 220 of timed text. Each of the segments 210, 220 may include a segment number 231, text 232, a start time 233, an end time 234, and a language identifier 235. The segments 210, 220 may also include layout information, such as a location 236 (e.g., <X,Y> coordinates). The segments 210, 220 may further include style information, such as a font 237, a font size 238, a style 239, a background color 240, and a foreground color 241. In selected embodiments, one or more of the data items illustrated in FIG. 2 may be optional. For example, layout information, font information, style information, etc. may be optional. In addition, various formats and values shown in FIG. 2 (e.g., time being represented in H:MM:SS.sss format, location being represented as an <X,Y> pair, the font "Proportional Sans Serif," the color "Black," the color "White," the style "Italics," etc.) are for illustration only. Alternate embodiments may use different formats and values (e.g., named definitions or enumerated data types).

In a particular embodiment, the segments 210, 220 may also include passed-through data 242. The passed-through data may represent closed captioning data or parameters that are left unmodified by an ingester (e.g., one of the ingesters 110-114 of FIG. 1) when converting closed captioning data from an input format into the platform-independent format. The passed-through data 242 may thus represent a tunneling mechanism through a media server (e.g., the media server 102 of FIG. 1) for platform-specific captioning data. A converter (e.g., one of the converters 120-126 of FIG. 1) may use the passed-through data 242 when generating closed captioning data compatible with a specific output format or protocol. Alternately, the converter may also leave the passed-through data 242 unmodified, so that a media player on a destination device receives and can act on the passed-through data 242. In a particular embodiment, the converter may ignore tunnel data.

Figure 3:
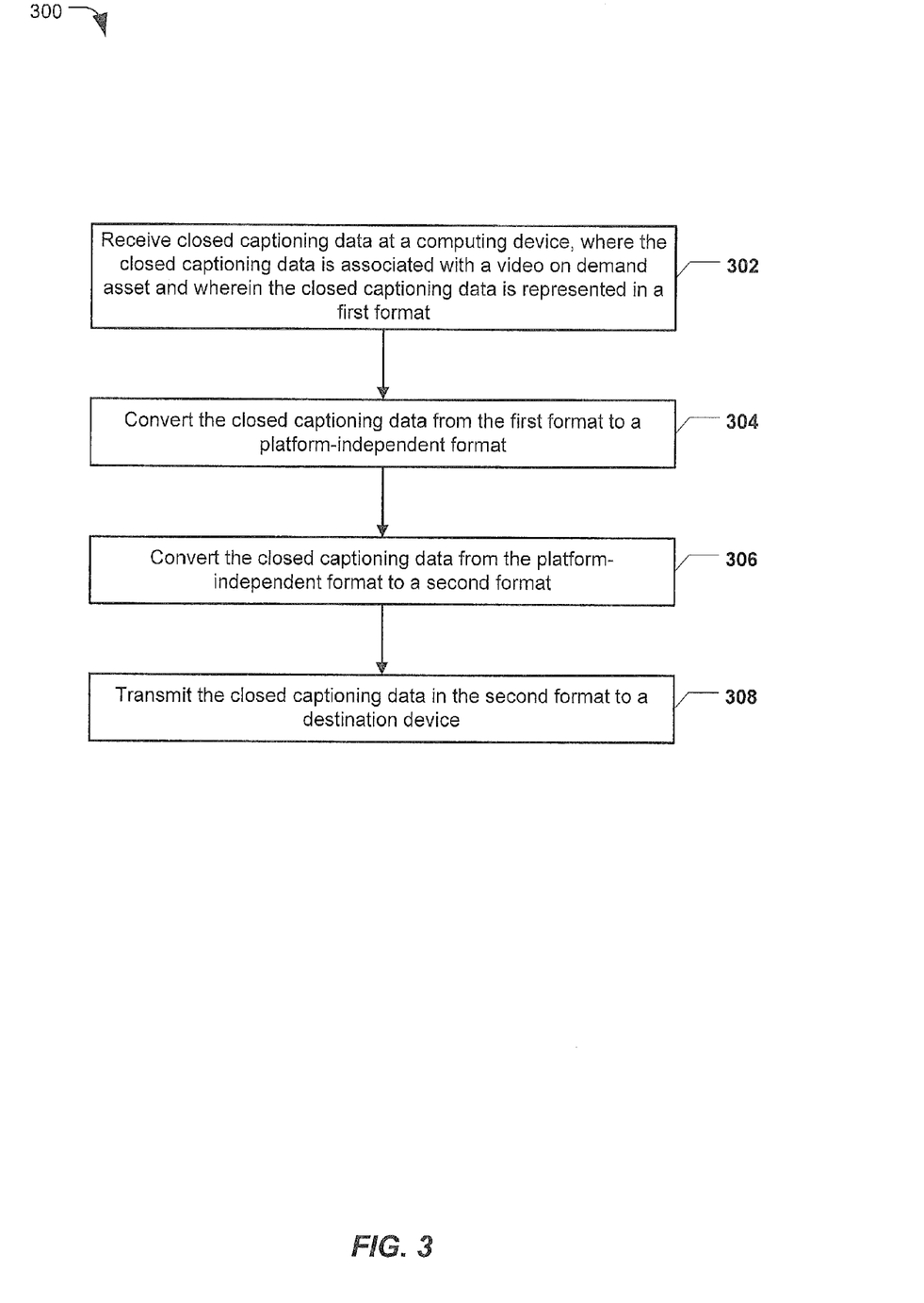
FIG. 3 is a flowchart to illustrate a particular embodiment of a method of processing closed captioning for video on demand content.

FIG. 3 is a flowchart to illustrate a particular embodiment of a method 300 of processing closed captioning. In an illustrative embodiment, the method 300 may be performed by the system 100 of FIG. 1.

The method 300 includes receiving closed captioning data at a computing device, at 302. The closed captioning data may be associated with a video on demand asset and may be represented in a first format. For example, in FIG. 1, the media server 102 may receive closed captioning data from one of the caption sources 130-134 via the input interface(s) 104.

The method 300 may also include converting the closed captioning data from the first format to a platform-independent format, at 304. For example, in FIG. 1, one of the ingesters 110-114 may convert the received closed captioning data to the platform-independent format.

The method 300 may further include converting the closed captioning data from the platform-independent format to a second format, at 306. For example, in FIG. 1, one of the converters 120-126 may convert the closed captioning data from the platform-independent format to output data in an output format.

The method 300 may include transmitting the closed captioning data in the second format to a destination device, at 308. For example, in FIG. 1, the media server 102 may transmit the output data in the output format to one or more of the destination devices 150-156 via the output interface(s) 106.

The method 300 of FIG. 3 may thus enable multi-format and dynamic receipt/conversion/transmission of closed captioning for video content (e.g., VOD assets).

Figure 4:
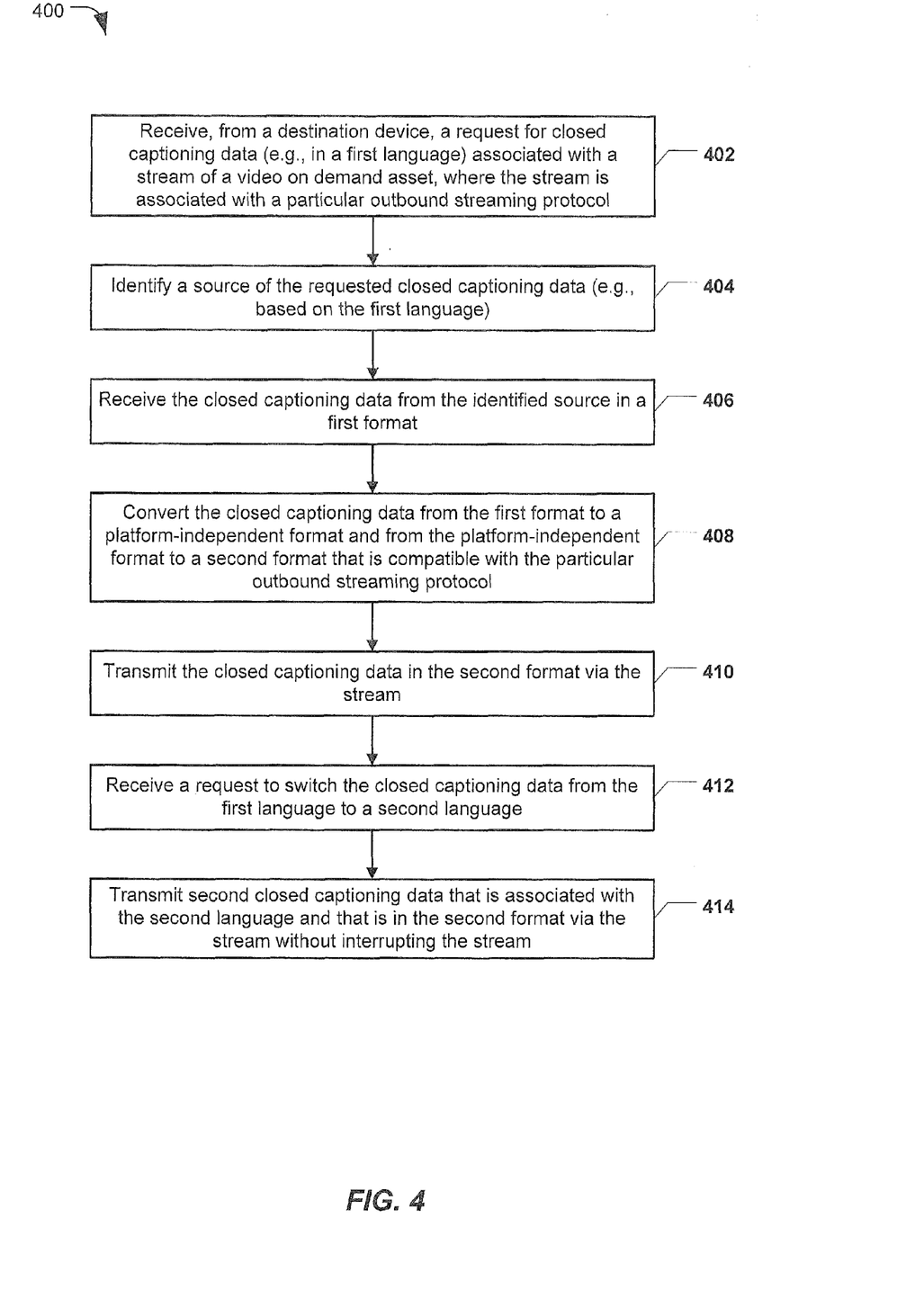
FIG. 4 is a flowchart to illustrate another particular embodiment of a method of processing closed captioning for video on demand content.

FIG. 4 is a flowchart to illustrate another particular embodiment of a method 400 of processing closed captioning. In an illustrative embodiment, the method 400 may be performed by the system 100 of FIG. 1

The method 400 includes receiving, from a destination device, a request for closed captioning data associated with a stream of a video on demand asset, at 402. The stream may be associated with a particular outbound streaming protocol. The request may indicate that the closed captioning data is to be in a first language (e.g., English, Spanish, French, German, Italian, Chinese, Japanese, etc.). For example, in FIG. 1, the media server 102 may receive a request from a destination device via the input interface(s) 104.

The method 400 may also include identifying a source of the requested closed captioning data (e.g., based on the first language), at 404. For example, in FIG. 1, the media server 102 may identify one of the sources 130-132. The media server 102 may also load an associated ingester (e.g., one of the ingesters 110-114) and an associated converter (e.g., one of the converters 120-126), if not already loaded.

The method 400 may further include receiving the closed captioning data from the identified source in a first format, at 406. For example, in FIG. 1, the media server 102 may receive closed captioning data in a first format via the input interface(s) 104.

The method 400 may include converting the closed captioning data from the first format to a platform-independent format and from the platform-independent format to a second format that is compatible with the particular outbound streaming protocol, at 408. For example, in FIG. 1, one of the ingesters 110-114 and one of the converters 120-126 may be used.

The method 400 may also include transmitting the closed captioning data in the second format via the stream, at 410. For example, in FIG. 1, the media server 102 may transmit the closed captioning data in the second format via the output interface(s) 106.

The method 400 may further include receiving a request to switch the closed captioning data from the first language to a second language, at 412, and transmitting second closed captioning data that is associated with the second language and that is in the second format via the stream without interrupting the stream, at 414. To illustrate, if a different source is identified for the closed captioning data in the second language, a different ingester 110-114 may be loaded. Thus, in the case of switching languages, one or more of the operations described with reference to steps 404-408 of FIG. 4 may be re-executed between steps 412 and 414. The same converter may remain active and may replace the closed captioning data in the first language with the closed captioning data in the second language without interrupting the VOD stream, so that a viewer sees a smooth transition from captions in the first language to captions in the second language.

The method 400 of FIG. 4 may thus enable multi-format and dynamic receipt/conversion/transmission of closed captioning for video content (e.g., VOD assets), including language transitions that are transparent and/or seamless to an end-user.

In accordance with various embodiments of the present disclosure, the methods, functions, and modules described herein may be implemented by software programs executable by a computer system. Further, in an exemplary embodiment, implementations can include distributed processing, component/object distributed processing, and parallel processing. Alternatively, virtual computer system processing can be constructed to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, a game console, or any combination thereof. The computer system may be connected, e.g., using a network, to other computer systems or peripheral devices. For example, the computer system or components thereof can include or be included within any one or more of the sources 130-134 of FIG. 1, the media server 102 of FIG. 1 (or components thereof), the destination devices 150-156 of FIG. 1, or any combination thereof. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a non-transitory computer-readable or processor-readable medium or storage device. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. For example, a computer-readable or processor-readable medium or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage medium or device.

In conjunction with the described embodiments, a method includes receiving closed captioning data at a computing device. The closed captioning data is associated with a video on demand asset and is represented in a first format. The method also includes, during a single VOD streaming session, converting the closed captioning data from the first format to a platform-independent format and converting the closed captioning data from the platform-independent format to a second format. The method further includes, during the single VOD streaming session, transmitting the closed captioning data in the second format to a destination device.

In another particular embodiment, an apparatus includes a processor and an input interface configured to receive closed captioning data associated with a video on demand asset, where the closed captioning data is represented in a first format. The apparatus also includes an ingester executable by the processor to, during a single VOD streaming session, convert the closed captioning data from the first format to a platform-independent format. The apparatus further includes a converter executable by the processor to, during the single VOD streaming session, convert the closed captioning data from the platform-independent format to a second format. The apparatus includes an output interface configured to transmit, during the single VOD streaming session, the closed captioning data in the second format to a destination device.

In another particular embodiment, a computer-readable storage device includes instructions that, when executed by a computer, cause the computer to receive, from a destination device, a request for closed captioning data associated with a stream of a video on demand asset. The stream is associated with a particular outbound streaming protocol. The instructions, when executed by the computer, also cause the computer to identify a source of the requested closed captioning data and to receive the closed captioning data from the identified source in a first format. The instructions, when executed by the computer, further cause the computer to convert, during a single VOD streaming session, the closed captioning data in the first format to a platform-independent format and from the platform-independent format to a second format that is compatible with the particular outbound streaming protocol. The instructions, when executed by the computer, cause the computer to transmit, during the single VOD streaming session, the closed captioning data in the second format via the stream.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving first closed captioning data at a computing device, wherein the first closed captioning data is associated with a video on demand asset and wherein the first closed captioning data is represented in a first format; and
   during a single video on demand streaming session:
      loading a first ingester that is compatible with the first format to convert the first closed captioning data from the first format to a platform-independent format;
      loading a first converter that is compatible with a second format to convert the first closed captioning data from the platform-independent format to the second format;
      transmitting the first closed captioning data in the second format to a destination device;

during transmission of the first closed captioning data in the second format to the destination device, receiving input from the destination device; and in response to the input:
- stopping transmission of the first closed captioning data;
- receiving second closed captioning data associated with the video on demand asset, wherein the second closed captioning data is represented in a third format;
- loading a second ingester that is compatible with the third format to convert the second closed captioning data from the third format to the platform-independent format;
- loading a second converter that is compatible with a fourth format to convert the second closed captioning data from the platform-independent format to the fourth format;
- converting, by the second converter, the second closed captioning data from the platform-independent format to the fourth format; and
- transmitting the second closed captioning data in the fourth format to the destination device.

2. The method of claim 1, wherein the first closed captioning data in the first format is received embedded in an input stream that includes at least a portion of the video on demand asset.

3. The method of claim 1, wherein the first closed captioning data in the first format is received in one or more closed captioning data files, transmitted in one or more closed captioning data files, or a combination thereof.

4. The method of claim 1, wherein the first closed captioning data in the second format is embedded in a stream that includes at least a portion of the video on demand asset.

5. The method of claim 1, wherein the first closed captioning data in the second format is transmitted in one or more closed captioning data files.

6. The method of claim 1, wherein the first closed captioning data in the second format is transmitted via the Internet.

7. The method of claim 1, wherein for a particular segment of timed text, the platform-independent format specifies a start time of the particular segment, an end time of the particular segment, a language identifier associated with the particular segment, layout information associated with the particular segment, font information associated with the particular segment, style information associated with the particular segment, or any combination thereof.

8. The method of claim 1, further comprising retrieving the first closed captioning data in the first format from one or more data storage devices during the single video on demand streaming session.

9. The method of claim 1, further comprising receiving the first closed captioning data in the first format from an external source during the single video on demand streaming session.

10. The method of claim 1, wherein the first format comprises an embedded format that includes:
- action message format (AMF) on TextData,
- consumer electronics association (CEA)-608,
- CEA-708,
- motion pictures expert group (MPEG)-4 part 17,
- 3rd generation partnership project (3GPP) timed text,
- digital video broadcasting (DVB) subtitling,
- sistema brasileiro de televisao digital (SBTVD),
- digital terrestrial multimedia broadcast (DTMB), or
- world system teletext (WST).

11. The method of claim 1, wherein the first format comprises a file format that includes:
- scenarist closed captioning (SCC),
- timed text markup language (TTML),
- distributed format exchange profile (DFXP),
- society of motion picture and television engineers (SMPTE) timed text (SMPTETT),
- web video text tracks (WebVTT),
- SubRip (SRT),
- synchronized accessible media interchange (SAMI), European broadcasting union (EBU)-STL, or EBU timed text (EBU-TT).

12. The method of claim 1, further comprising transmitting the second closed captioning data in the fourth format from a media server to the destination device, wherein the media server supports transmission of closed captioning data in accordance with:
- hypertext transfer protocol (HTTP) live streaming (HLS),
- HTTP dynamic streaming (HDS),
- smooth streaming, and
- motion picture experts group (MPEG) dynamic adaptive streaming over HTTP (MPEG-DASH).

13. The method of claim 1, wherein:
- the first closed captioning data in the first format includes first data and second data, wherein the second data comprises pass-through data;
- the first ingester generates the first closed captioning data in the platform-independent format by converting the first data from the first format to the platform-independent format and refraining from modifying the second data;
- the first converter generates the closed captioning data in the second format by converting the first data from the platform independent format to the second format and refraining from modifying the second data; and
- the first closed captioning data is transmitted in the second format to the destination device by transmitting the first data in the second format to the destination device and transmitting the unmodified second data to the destination device.

14. An apparatus comprising:
- a processor;
- an input interface to receive closed captioning data associated with a video on demand asset, wherein the closed captioning data is represented in a first format, wherein the closed captioning data in the first format includes first data and second data, wherein the second data comprises pass-through data;
- an ingester executable by the processor to, during a single video on demand streaming session, convert the first data from the first format to a platform-independent format and refrain from modifying the second data;
- a converter executable by the processor to, during the single video on demand streaming session, convert the first data from the platform-independent format to a second format and refrain from modifying the second data; and
- an output interface to, during the single video on demand streaming session, transmit the first data in the second format to a destination device and transmit the unmodified second data to the destination device.

15. The apparatus of claim 14, further comprising one or more storage devices to store video on demand assets, closed captioning data, or any combination thereof.

16. The apparatus of claim 14, wherein the destination device comprises a smartphone, a tablet computer, a laptop computer, a desktop computer, a set-top box, a television, a portable media player, a game console, or any combination thereof.

17. The apparatus of claim 14, further comprising:
one or more storage devices to store video on demand assets, closed captioning data, or any combination thereof;
a plurality of ingesters executable by the processor, wherein the plurality of ingesters includes at least one ingester to process closed captioning data stored in one or more files, at least one ingester to extract closed captioning data from a video stream, or any combination thereof; and
a plurality of converters executable by the processor.

18. A computer-readable storage device comprising instructions that, when executed by a computer, cause the computer to:
receive, from a destination device, a request for closed captioning data associated with a stream of a video on demand asset, wherein the stream is associated with a particular outbound streaming protocol;
identify a source of the requested closed captioning data;
receive the closed captioning data from the identified source in a first format;
convert, during a single video on demand streaming session, the closed captioning data in the first format to a platform-independent format and from the platform-independent format to a second format that is compatible with the particular outbound streaming protocol, wherein converting the closed captioning data from the platform-independent format to the second format includes adding a first font characteristic to a first portion of the closed captioning data and adding a second font characteristic that is different from the first font characteristic to a second portion of the closed captioning data, wherein the first font characteristic and the second font characteristic are absent from the closed captioning data in the first format; and
transmit, during the single video on demand streaming session, the closed captioning data in the second format via the stream.

19. The computer-readable storage device of claim 18, further comprising instructions that, when executed by the computer, cause the computer to:
receive a request for the closed captioning data in a first language; and
identify the source based on the first language.

20. The computer-readable storage device of claim 19, further comprising instructions that, when executed by the computer, cause the computer to switch the closed captioning data from the first language to a second language without interrupting communication of the stream of the video on demand asset.

* * * * *